United States Patent
Ogino et al.

(10) Patent No.: US 6,235,064 B1
(45) Date of Patent: *May 22, 2001

(54) DYE CONTAINING POLARIZING FILM

(75) Inventors: Kazuya Ogino, Minoo; Narutoshi Hayashi; Setsuko Yamamoto, both of Toyonaka; Takashi Omura, Kobe, all of (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/249,736

(22) Filed: May 26, 1994

(30) Foreign Application Priority Data

May 28, 1993 (JP) ...................................................... 5-127111

(51) Int. Cl.$^7$ ................................ D06P 7/00; C09B 45/24; G02B 5/30

(52) U.S. Cl. .......................... 8/489; 8/641; 8/506; 8/685; 8/687; 427/163.1; 252/585

(58) Field of Search ................................ 8/506, 639, 641, 8/662, 681, 685, 687, 489; 427/163.1; 359/491; 252/585

(56) References Cited

U.S. PATENT DOCUMENTS 4,895,677 * 1/1990 Okumura et al. ..................... 252/585

FOREIGN PATENT DOCUMENTS

| | | |
|---|---|---|
| 3236238 | 5/1984 | (DE) . |
| 0342241 | 11/1989 | (EP) . |
| 530106 * | 3/1993 | (EP) . |
| 0584962 | 3/1994 | (EP) . |
| 0593324 | 4/1994 | (EP) . |
| 553014 | 3/1993 | (JP) . |

* cited by examiner

Primary Examiner—Margaret Einsmann
(74) Attorney, Agent, or Firm—Stevens, Davis, Miller & Mosher, L.L.P.

(57) ABSTRACT

A dye-containing polarizing film having neutral color which comprises at least one disazo dye represented by the formula (I) in the form of the free acid

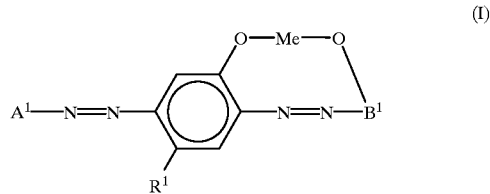

wherein Me is a transition metal selected from copper, nickel, zinc and iron, $A^1$ is phenyl or naphthyl which may be substituted or substituted. $B^1$ is 1-naphthol or 2-naphthol residue which may be unsubstituted or substituted and in which its hydroxy group is adjacent to the azo group and is linked with the transition metal Me to form the complex, and $R_1$ is a lower alkoxy; and at least two of other specific dyes, and the film causes no light to break through the film at dark state within the visible radiation wavelength region and is excellent in the polarizing activities as well as the durability to water and heat.

8 Claims, No Drawings

DYE CONTAINING POLARIZING FILM

This invention relates to a polarizing film containing dyestuffs.

Currently, polarizing films are generally prepared by incorporating iodine or a dichromatic dye as a polarizing element into a polyvinyl alcohol film which has been oriented by stretching, or a polyene film which has been prepared by dehydrochlorinating a polyvinyl chloride film or dehydrating a polyvinyl alcohol film to produce polyene and orientating the film.

Among those, iodine-containing polarizing films are good in early stage polarizing activities, but poor in the durability to water and heat. Thus, the films have some drawbacks in the lowered polarizing activities after having been used for a certain period of time at high temperatures under highly humid conditions. Several methods for improving the durability have been proposed, in which the film is treated with formalin or an aqueous boric acid solution, or a polymer film having a low moisture permeability is employed as a protecting film, but these methods are not yet fully satisfactory.

A dye-containing polarizing films using a dichromatic dye as a polarizing element is better in the durability to water and heat than iodine-containing polarizing film, but poor in the polarizing activities.

The dichromatic dye-containing polarizing film of neutral color is prepared by incorporating two or more kinds of dichromatic dyes into a polymer film and then orientating the film. If light breaks through two said polarizing films, which are superposed on each other so that those orientation directions meet at right angles (crossed state), at a specific wavelength within the visible radiation wavelength region, particularly from 400 to 700 nm, color of a liquid crystal display using the two polarizing films often changes from the color that the display should have at a dark state.

In order to prevent the color change of the display due to the light breaking through the films at a specific wave length, the light transmittance of the polarizing films at crossed state (cross light transmittance) must be lowered over the visible radiation wavelength region, particularly from 400 to 700 nm.

An object of the present invention is to provide a polarizing film of neutral color which is prepared by incorporating two or more kinds of dichromatic dyes into a film and then orientating the film, through which no light breaks at crossed state within the visible radiation wavelength region, particularly from 400 to 700 nm and which is excellent in the polarizing activities as well as the durability to water and heat.

The present inventors have extensively studied to accomplish the object, have found a polarizing film of neutral color containing specific dyes exhibits excellent properties for this object, and, as a result, have attained to the present invention.

The present invention provides a dye-containing polarizing film comprising, in the film substrate at least one kind of disazo dyes represented by the following formula (I) in the form of the free acid

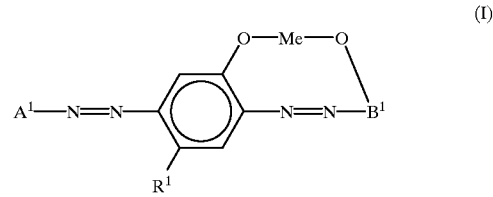

wherein Me is a transition metal selected from copper, nickel, zinc and iron, $A^1$ is a phenyl or naphthyl group which may be substituted, $B^1$ is a 1-naphthol or 2-naphthol residue which may be substituted and in which its hydroxy group is adjacent to the azo group and is linked with the transition metal Me to form the complex, and $R_1$ is a lower alkoxy; and at least two dyes selected from a group consisting of [A], [B] and [C] described bellow.

[A] A group consisting of disazo dyes represented by the following formula (II) in the form of free acid

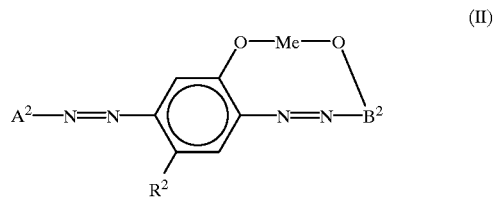

wherein Me is a transition metal selected from copper, nichel, zinc and iron, $A^2$ is a phenyl or naphthyl group which may be substituted, $B^2$ is a 1-naphthol or 2-naphthol residue which may be substituted and in which the hydroxy group is adjacent to the azo group and is linked with the transition metal Me to form the complex, and $R^2$ is hydrogen, a lower alkyl or sulfo group or an amino group which may be substituted.

[B] A group consisting of trisazo dyes represented by the following formula (III) in the form of free acid

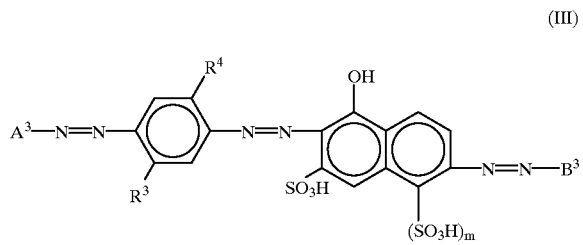

wherein $A^3$ and $B^3$ are same or different and are phenyl or naphthyl groups which may be substituted, $R^3$ is hydrogen, a lower alkyl, lower alkoxy or sulfo group or an amino group which may be substituted, $R^4$ is a hydrogen, a hydroxy or lower alkoxy group, and m is 0 or 1; and copper complex salts thereof.

[C] A group consisting of C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81, and C.I. Direct Red 247.

As mentioned above, the dye-containing polarizing film of the present invention contains the disazo dye represented by the formula (I) and at least two kinds of dyes selected from the group consisting of [A], [B] and [C].

As the latter, as long as being selected from the group consisting of [A], [B] and [C], any combinations of the dyes can be employed. For example, all of the dyes may be selected only from [A]. Likewise, all of the dyes may be selected only from [B] or only from [C] and a combination of dyes from different groups can also be employed.

The polarizing film described above has neutral color and is characterized in that it causes no light to break through the films at the dark state over the visible radiation wavelength region, particularly from 400 to 700 nm, has excellent polarizing activities and causes no discoloration and deterioration of polarizing activities under high temperature and high humid condition.

Preferable examples of the polarizing film include a film which contains a kind of the disazo dye represented by the formula (I) and two kinds of dyes selected from the group [C]; a film which contains a kind of the disazo dye represented by the formula (I), a kind of dye selected from the group [A] and two kind of dye selected from the group [C] and a film which contains a kind of the disazo dye represented by the formula (I), a kind of dye selected from the group [B] and a kind of dye selected from the group [C].

As the disazo dyes represented by the formula (I) or the formula (II), the copper complex salt thereof are preferably used. Namely, Me in the formula (I) and the formula (II) are preferably copper.

In the formula (I) and (II), $A^1$ and $A^2$ may be same or different and are phenyl or naphthyl groups which may be substituted. The substituent of the phenyl group includes, for example, sulfo, sulfamoyl, nitro, $C_1$–$C_4$ alkyl, $C_1$–$C_4$ alkoxy, carboxy, halogen and unsubstituted, monosubstituted or disubstituted amino. The substituent of the amino includes, for examples, $C_{1-4}$ alkyl which is unsubstituted or substituted by hydroxy, cyano or the like, and $C_{1-4}$ alkylcarbonyl. As the phenyl denoted by $A_1$ or $A_2$, preferable is phenyl which is substituted by one or two substituents selected from sulfo, sulfamoyl, nitro, methyl, ethyl, methoxy, ethoxy, carboxy, chlorine and unsubstituted or substituted amino. As the phenyl group particularly preferable is sulfophenyl.

The substituent of the naphthyl denoted $A^1$ or $A^2$ includes, for example, sulfo and hydroxy. Among the naphthyl, preferable is the naphthyl substituted by 1–3 sulfo groups, and particularly preferable is mono- or disulfonaphthyl.

In the formula (I) and (II), $B^1$ and $B^2$ are same or different and are 1-naphthol or 2-naphthol residues which may be substituted. Among them preferable is 1-naphthol which may be substituted.

The substituent of the 1- or 2-naphthol includes, for example, sulfo, hydroxy and substituted and unsubstituted amino, provided that the hydroxy does not substitute adjacent to the azo group. Substituted amino may be either mono- or disubstituted and the substituent of the amino includes, for example, $C_{1-4}$ alkyl, $C_{1-4}$ alkylcarbonyl, carbamoyl, sulfamoyl, unsubstituted or substituted phenyl and unsubstituted or substituted benzoyl. The substituent of the phenyl or the benzoyl includes, for example, sulfo, amino and $C_{1-4}$ alkoxy.

In formula (I), $R^1$ is lower alkoxy such as $C_{1-4}$ alkoxy. Among the $C_{1-4}$ alkoxy, methoxy or ethoxy is preferable and particularly preferable is methoxy group.

In formula (II), $R^2$ is hydrogen, a lower alkyl such as $C_{1-4}$ alkyl or sulfo group or an amino group which may be substituted. Among the $C_{1-4}$ alkyl, methyl or ethyl is preferable and particularly preferable is methyl. Substituted amino may be mono- or disubstituted amino and the substituent of amino includes, for example, $C_{1-4}$ alkyl, $C_{1-4}$ alkylcarbonyl, $C_{1-4}$ alkylsulfonyl and carbamoyl.

In the formula (III), $A^3$ and $B^3$ may be unsubstituted or substituted phenyl, or unsubstituted or substituted naphthyl. The substituent of the phenyl includes, for example, sulfo, sulfamoyl, nitro, $C_{1-4}$ alkyl, $C_{1-4}$ alkoxy, carboxy, hydroxy, halogen, and unsubstituted or substituted amino. The substituent of the naphthyl includes, for example, sulfo, hydroxy and unsubstituted or substituted amino. The substituted amino may be mono- or disubstituted amino and the substituent of the amino includes, for example, $C_{1-4}$ alkyl which may be unsubstituted or substituted by hydroxy or cyano, $C_{1-4}$ alkylcarbonyl, phenyl, sulfophenyl, disulfophenyl, benzyl and carbamoyl.

The phenyl denoted by $A^3$ is preferably phenyl which is substituted by one or two substituents selected from sulfo, sulfomoyl, nitro, methyl, ethyl, methoxy, ethoxy, carboxy, chlorine and unsubstituted or substituted amino. Particularly preferable as the phenyl is sulfophenyl.

The naphthyl denoted by $A^3$ is preferably naphthyl substituted by 1–3 sulfo, and particularly preferable is mono- or disulfonaphthyl.

As the phenyl denoted by $B^3$, one of the following is preferable.

(1) Phenyl which is substituted by one or two amino groups which may be substituted, and may be further substituted by hydroxy, sulfo, $C_{1-4}$ alkyl, $C_{1-4}$ alkoxy or carboxy.

(2) Phenyl which is substituted by one, two or three hydroxy groups, and may be further substituted by amino which may be substituted, sulfo, $C_{1-4}$ alkyl, $C_{1-4}$ alkoxy or carboxy.

As the naphthyl denoted by $B^3$, one of the following is preferable.

(1) Naphthyl which is substituted by one or two hydroxy groups, and may be further substituted by sulfo, unsubstituted amino, acetyl, phenyl, sulfophenyl disulfophenyl, benzoyl or methylsubstituted amino.

(2) Naphthyl which is substituted by one or two unsubstituted amino groups or amino groups which is substituted by methyl, ethyl, hydoxyethyl, cyanoethyl, acetyl or carbamoyl, and may be further substituted by hydroxy or sulfo.

In formula (III), $R^3$ is hydrogen, lower alkyl, lower alkoxy, sulfo or amino which may be substituted. The lower alkyl includes $C_{1-4}$ alkyl, and the lower alkoxy includes $C_{1-4}$ alkoxy. The substituted amino includes monosubstituted or disubstituted amino group, and the substituent of the amino includes, for example, $C_{1-4}$ alkyl, $C_{1-4}$ alkylcarbonyl, $C_{1-4}$ alkylsulfonyl or carbamoyl. In formula (III), $R^4$ is hydrogen, hydroxy or lower alkoxy. The lower alkoxy includes $C_{1-4}$ alkoxy. In the case of the trisazo dye of formula (III) forming a copper complex salt, the copper complex salt is formed between the hydroxy group of the 1-hydroxy-3-sulfo-2,6-naphthylene group in formula (III) and the hydroxy group represented by $R^4$.

The disazo dye represented by formula (I) or formula (II) can be produced through a conventional process comprising a diazotization, a coupling and a formation of metal complex salt, according to a known manner described, for example, in DE 3236238 A or J 89-5623 B.

The trisazo dye represented by formula (III) or a copper-complex salt thereof can be produced through a conventional process which comprises a diazotization and a coupling and, in the case of forming a copper complex, further comprises a formation of copper complex salt, according to a known manner described, for example, in J 90-75672A.

Preferable disazo dye represented by the formula (I) includes dyes represented by following formulae (I-1) to (I-15) in the form of free acid.

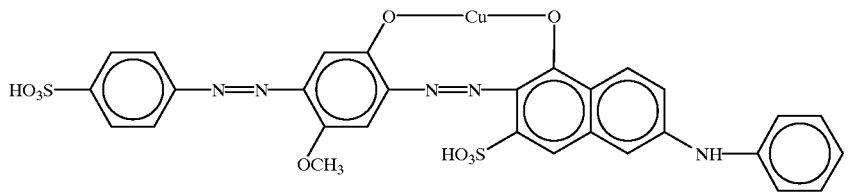
(I-1)
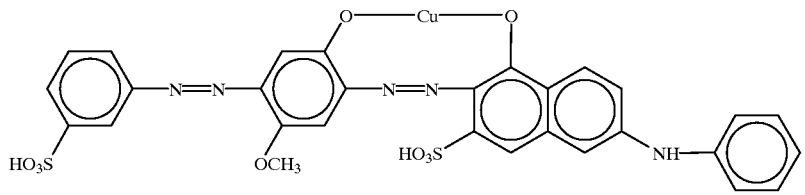
(I-2)
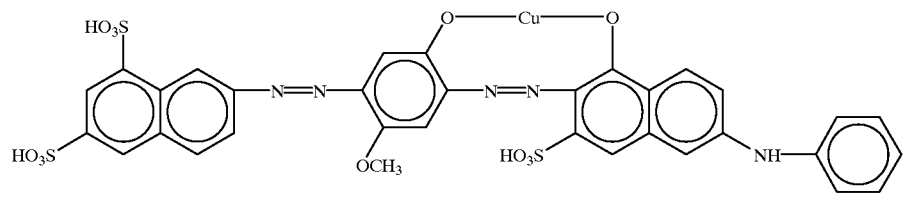
(I-3)
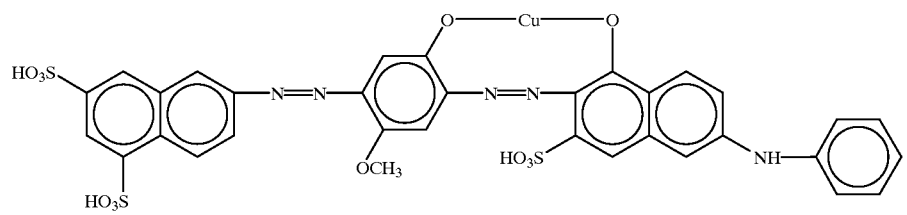
(I-4)
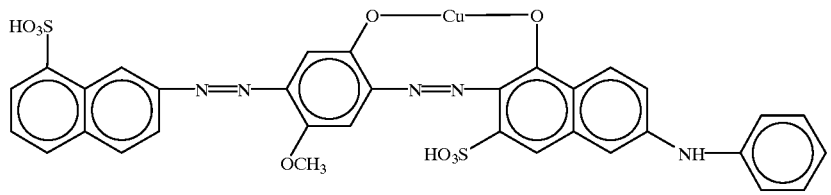
(I-5)
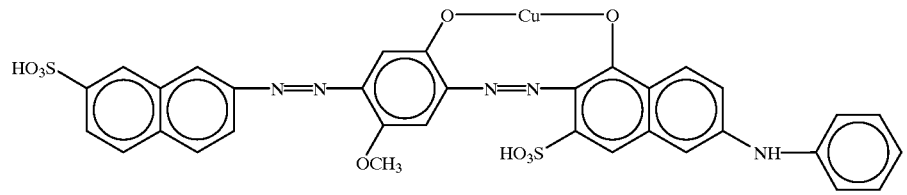
(I-6)
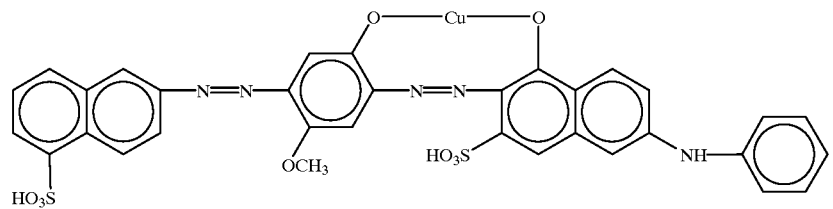
(I-7)

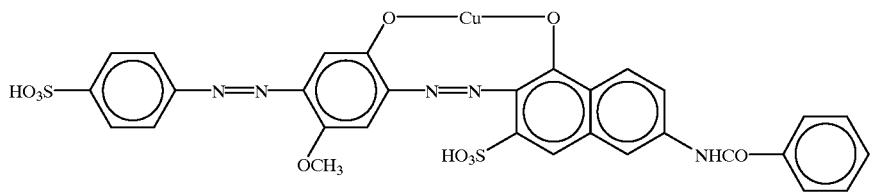
(I-8)
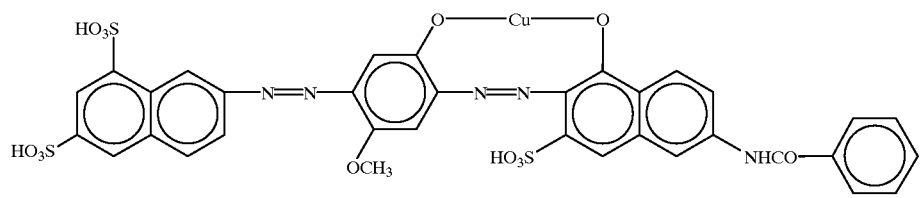
(I-9)
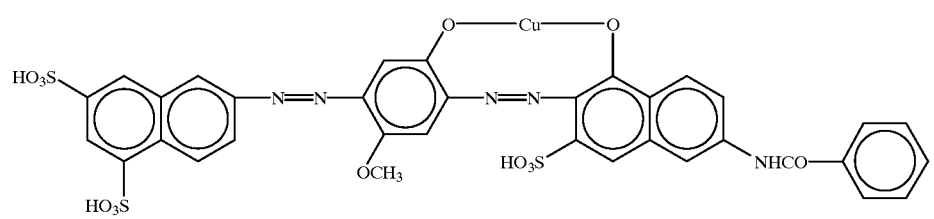
(I-10)
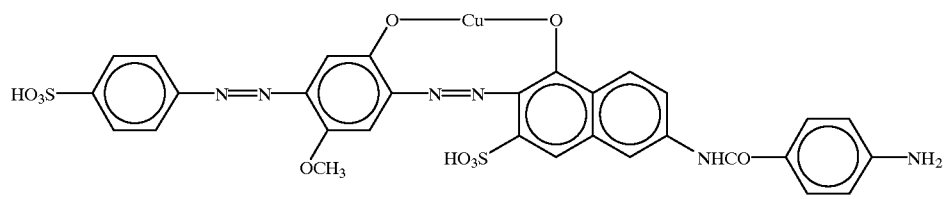
(I-11)
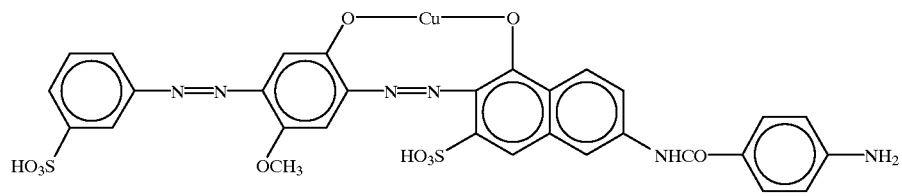
(I-12)
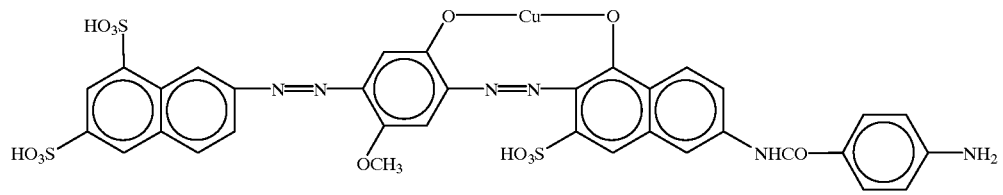
(I-13)
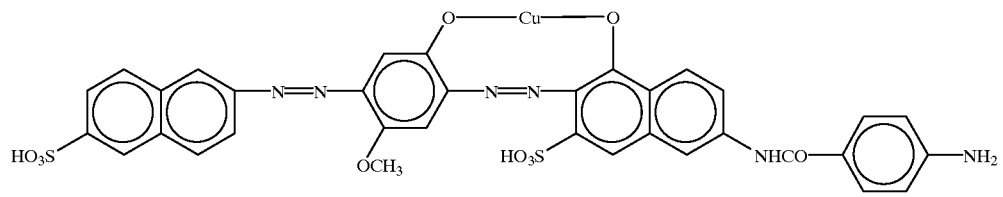
(I-14)

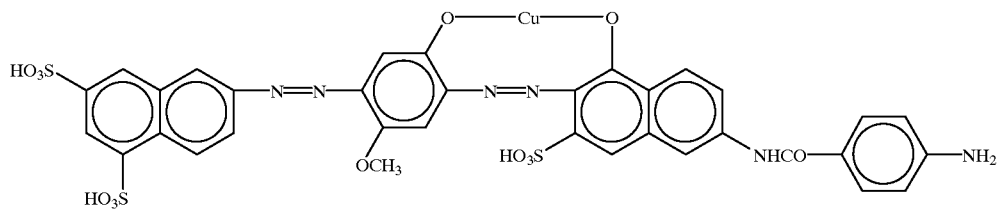
(I-15)
The disazo dye represented by the formula (II) preferably includes dyes represented by following formulae (II-1) to (II-9) in the form of free acid.
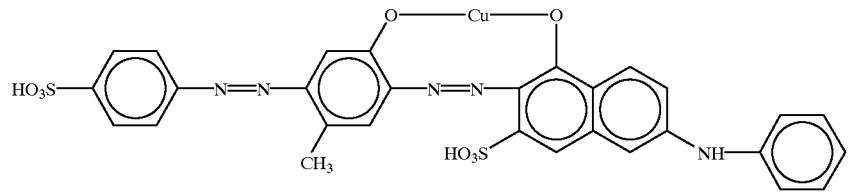
(II-1)
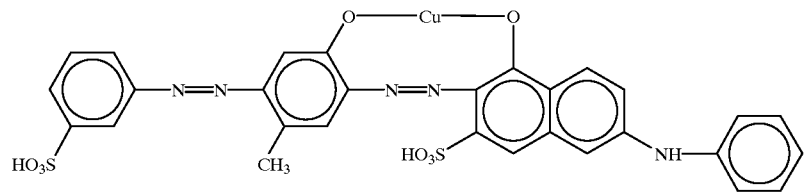
(II-2)
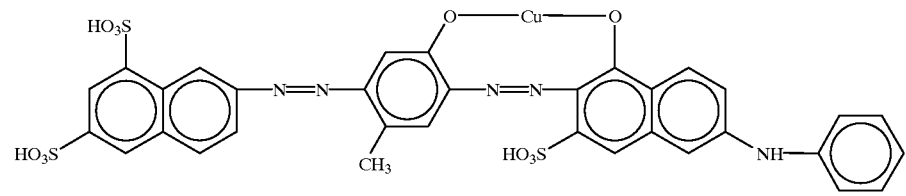
(II-3)
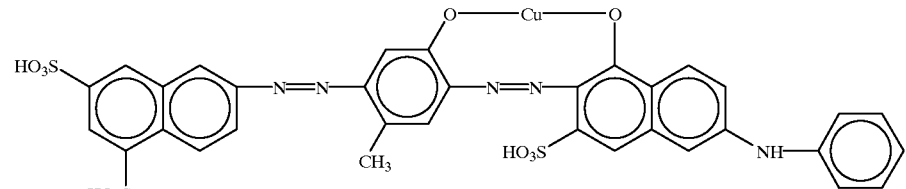
(II-4)
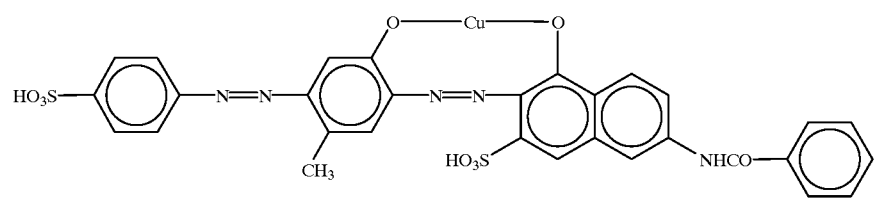
(II-5)

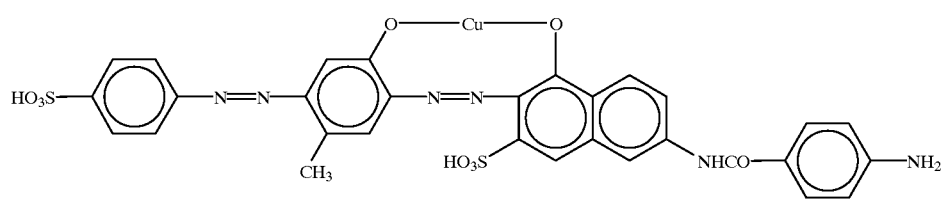
(II-6)
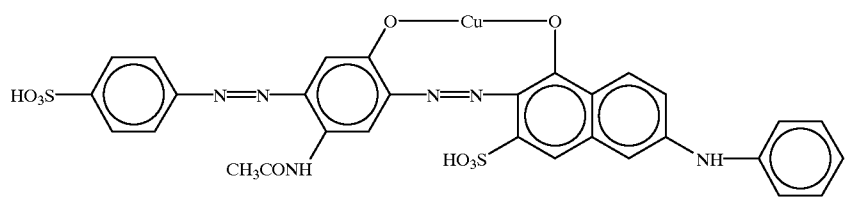
(II-7)
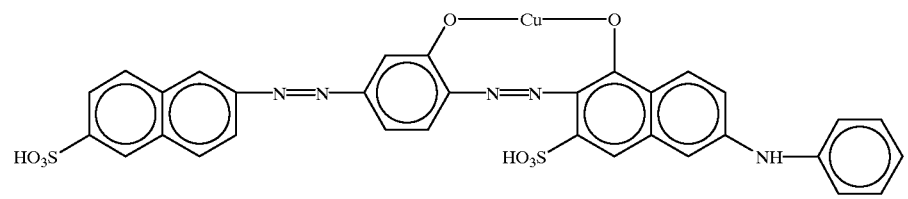
(II-8)
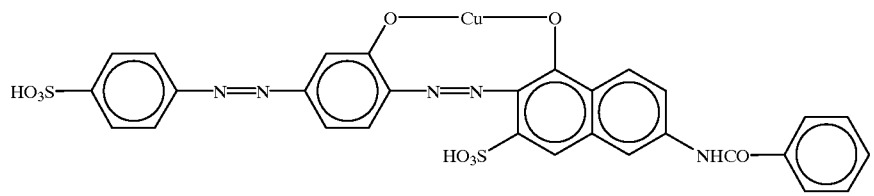
(II-9)
The trisazo dye represented by the formula (III), preferably includes dyes represented by following formulae (III-1)–(III-11) in the form of free acid.
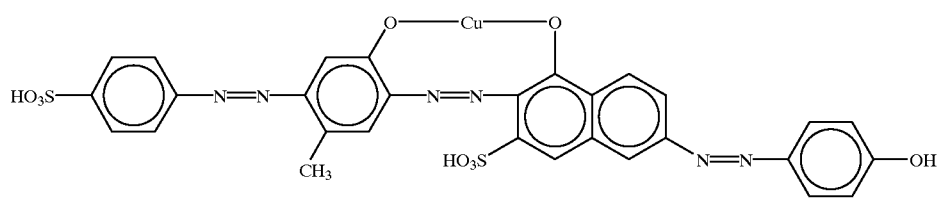
(III-1)
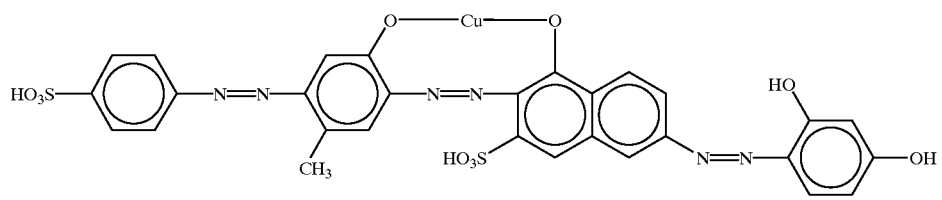
(III-2)

(III-3)
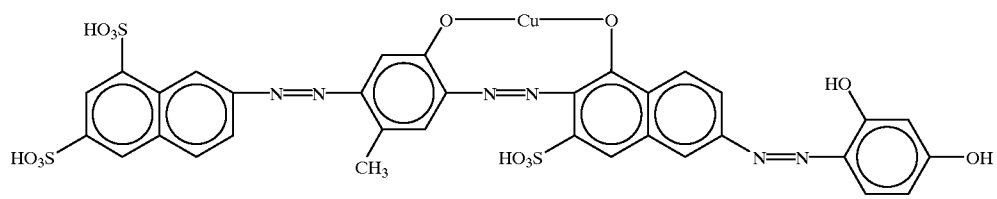
(III-4)
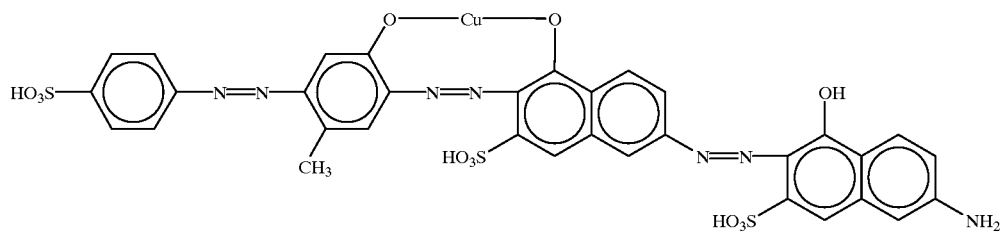
(III-5)
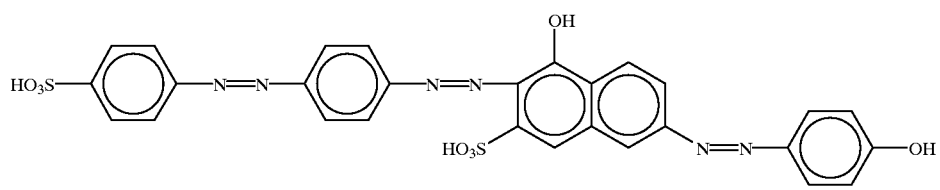
(III-6)
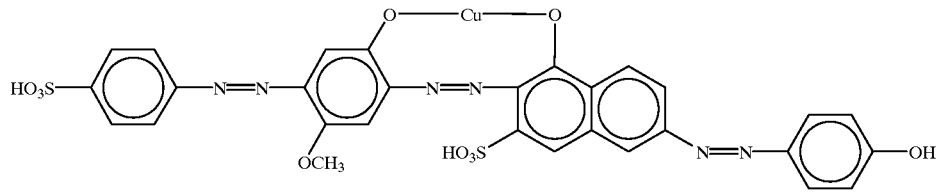
(III-7)
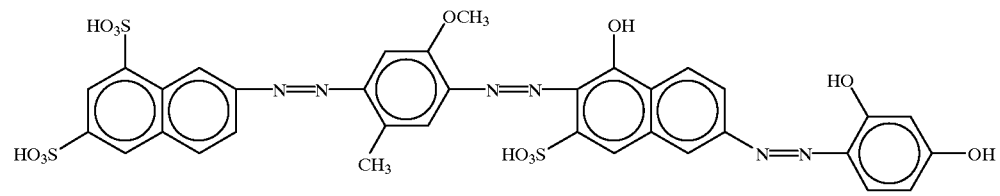
(III-8)
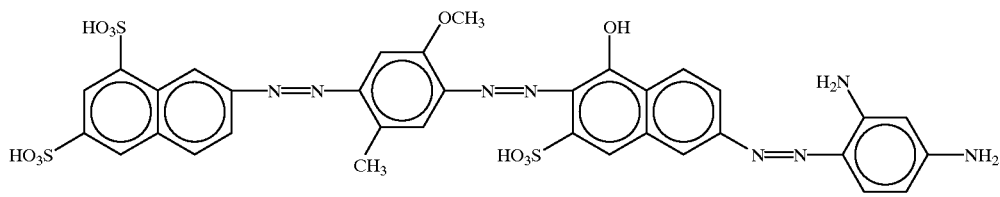
(III-9)
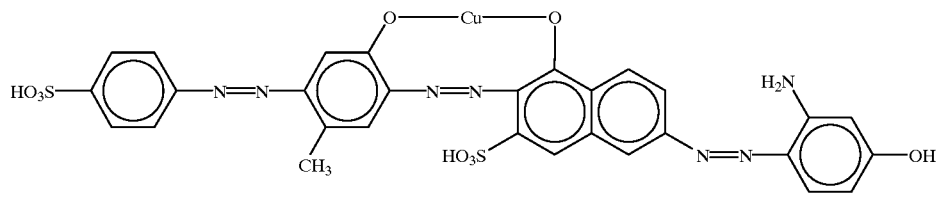

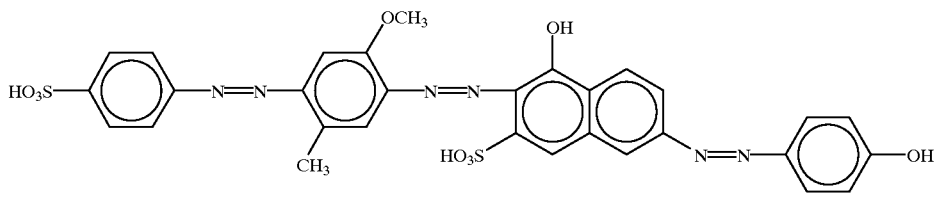

(III-10)

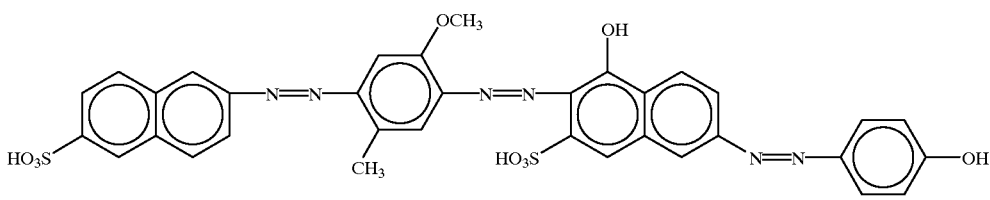

(III-11)

The dyes contained in the polarizing film of the present invention are usually used in the form of sodium salt, though they can also be used in the form of free acid or in the form of salt of other alkaline metal such as lithium or potassium, ammonium or amine such as ethanolamine or alkylamine.

The dyes selected from the group [C] are easily available and are on the market. They include, for example, following dyes which are represented by Color Index Generic Names and trade names of Sumitomo Chemical Co. Ltd.

C.I. Direct Yellow 12, (Chrysophenine)
C.I. Direct Yellow 28, (Sumilight Supra Yellow BC conc.)
C.I. Direct Yellow 44, (Direct Fast Yellow GC)
C.I. Direct Orange 26, (Direct Fast Orange S)
C.I. Direct Orange 39, (Sumilight Supra Orange 2GL 125%)
C.I. Direct Orange 107, (Sumilight Supra Orange GD extra conc.)
C.I. Direct Red 2, (Benzopurpurine 4B)
C.I. Direct Red 31, (Nippon Fast Red BB conc.)
C.I. Direct Red 79, (Sumilight Supra Red 4BL 170%)
C.I. Direct Red 81, (Sumilight Red 4B)
C.I. Direct Red 247, (Japanol Fast Red FA)

The Polarizing film of the present invention may be prepared by incorporating dichromatic dyes into a polymer film substrate according to a well-known method.

The polymer film used as the substrate is made of a polymer which includes polyvinyl alcohol or its derivative which is unmodified or modified with an olefin such as ethylene and propylene or an unsaturated fatty acid such as crotonic acid, acrylic acid, methacrylic acid, maleic acid or the like; EVA (ethylenevinyl acetate) resin; a saponified EVA resin; a nylon resin; a polyester resin and the like. A film made of polyvinyl alcohol or its derivative is particularly useful from the view points of the dye fixation and the orientation.

Incorporation of the dichromatic dye into a polymer film is usually carried out according to a conventional method for dyeing a polymer film. For instance, the dichromatic organic dyes are dissolved in water to prepare a dye bath. The dye concentration in the dye bath is not critical, but usually in the range from 0.0001 to 10% by weight. If necessary, a dyeing assistant such as sodium sulfate may be used. Preferably the sodium sulfate is used in an concentration from 1 to 10% by weight. Dyeing is carried out by dipping a polymer film into the dye bath thus prepared. Dyeing temperature is preferably in the range from 40 to 80° C.

Dyeing the polymer film, the ratio of the disazo dye represented by the formula (I) to the at least two kinds of dyes selected from the group consisting of [A], [B] and [C] is not critical, but usually the weight ratio of the latter to the former is in the range from 0.1 to 3.0.

The orientation of the dichromatic dye incorporated in the polymer film is conducted by stretching the film once or several times and may be conducted prior to the dyeing, during the dyeing, or after the dyeing. Stretching may be conducted according to any of well-known methods. For instance, stretching the film of polyvinyl alcohol or its derivative can be conducted by either wet stretching method or a dry stretching method.

If necessary, the polymer film is subjected to a post-treatment such as a boric acid treatment according to a well-known method in order to improve the light transmittance and polarizing activity of the polarizing film. Conditions for the boric acid treatment vary depending on the kinds of the polymer film and the dichromatic dyes employed. The treatment is usually carried out in an aqueous boric acid solution having a concentration from 1 to 15% by weight, preferably from 5 to 10% by weight, at a temperature of 30 to 80° C., preferably from 50 to 75°.

The polymer film may further be subjected, if necessary, to a fixing treatment in an aqueous solution containing a cationic polymer compound.

The dye-containing polarizing film thus obtained may be laminated with a protective film having excellent optical transparency and mechanical strength, on one or both sides, to form a protected polarizing plate. The protective film includes, for example, cellulose acetate film and acrylic film which have been conventionally used, a fluorine type film such as a tetrafluoroethylene/hexafluoropropylene copolymer film, and a film of polyester resin, a polyolefin resin or a polyamide resin.

The present invention is now explained in more details with reference to the following examples, which are only illustrative, and never to limit the invention. In the examples, "part" means "part by weight", and "%" means "% by weight".

The term "light transmittance" referred to in the following examples means a value indicating a light transmittance (T) of the polarizing film at a specific wave length, measured by TC-1800M produced by Tokyo Denshoku Ltd., or a value of visible sensitivity adjust light transmittance (Y) calculated according to JIS Z 8701 (Specification of Colors According to the CIE 1931 Standard Colorimetric System and the CIE 1964 Supplementary Standard Colorimetric System).

Tp and Yp are, respectively, values of T and Y of two pieces of the polarizing film measured in a state wherein the both films are superposed upon each other so that they have same orientation directions (these light transmittances are called parallel light transmittance) and Tr and Yr are, respectively, values of T and Y of two pieces of the polarizing film measured in a state wherein the both films are superposed upon each other so that their orientation directions meet at right angles (these light transmittances are "called cross light transmittance".).

The term "degree of polarization (Py)" means a value obtained according to the following equation.

$$Py = \sqrt{\frac{Y_p - Y_r}{Y_p + Y_r}} \times 100 \, (\%)$$

ΔTr and Tr. max represent the difference between the maximum and minimum values of Tr and the maximum value of Tr, respectively, measured in a wavelength range of 400–700 nm, and are a parameter indicating light breaking through the films in the state wherein both films are superposed upon each other so that their orientation directions meet at right angle.

EXAMPLE 1

A polyvinyl alcohol film of 75 μm in thickness (Kuraray Vinylon #7500) was stretched to five times its original length in a longitudinal uniaxial direction to prepare the substrate of a polarizing film. The resulting film was dipped for 8 minutes, as kept in the tentioned state, into 65° C. aqueous solution prepared by dissolving 0.075 part of sodium salt of copper-containing disazo dye represented by the formula (1-1), 0.023 part of C.I. direct red 81, 0.008 part of C.I. direct yellow 12 and 2.0 parts of sodium sulfate into 100 parts of water. Thereafter, the film was dipped for 5 minutes into 65° C. aqueous solution prepared by dissolving 7.5 parts of boric acid in 100 parts of water and then washed with 20° C. water for 20 seconds to obtain a dye-containing polarizing film having neutral color.

The light polarization characteristics of the resulting film are shown in Table 1.

EXAMPLE 2

According to the same method as in Example 1, a substrate of polarizing film was prepared. The resulting film was dipped for 6.8 minutes into 65° C. aqueous solution prepared by dissolving 0.155 part of sodium salt of copper-containing disazo dye represented by the formula (I-1), 0.026 part of sodium salt of copper-containing disazo dye represented by the formula (II-1), (the dye represented by formula II-1 is a blue dye) 0.006 part of C.I. direct red 81, 0.003 part of C.I. direct yellow 12 and 2.0 parts of sodium salfate into 100 parts of water. Thereafter, the film was dipped for 5 minutes into 65° C. aqueous solution prepared by dissolving 7.5 parts of boric acid into 100 parts of water, and then washed with 20° C. water for 20 seconds to obtain a dye-containing polarizing film having neutral color.

The light polarization characteristics of the resulting film are shown in Table 1.

EXAMPLE 3

According to the same method as in Example 1, a substrate of polarizing film was prepared. The resulting film was dipped for 6.5 minutes into 65° C. aqueous solution prepared by dissolving 0.090 part of sodium salt of copper-containing disazo dye represented by the formula (I-3), 0.040 part of sodium salt of copper-containing disazo dye represented by the formula (II-1), 0.015 part of C.I. direct red 81, 0.003 part of C.I. direct yellow 12 and 2.0 parts of sodium salfate into 100 parts of water. Thereafter, the film was dipped for 5 minutes into 65° C. aqueous solution prepared by dissolving 7.5 parts of boric acid into 100 parts of water, and then washed with 20° C. water for 20 seconds to obtain a dye-containing polarizing film having neutral color.

The light polarization characteristics of the 5 resulting film are shown in Table 1.

EXAMPLE 4

According to the same method as in Example 1, a substrate of polarizing film was prepared. The resulting film was dipped for 30 minutes into 65° C. aqueous solution prepared by dissolving 0.025 part of potassium salt of copper-containing disazo dye represented by the formula (I-11), 0.003 part of C.I. direct red 81, 0.025 part of C.I. direct yellow 28 and 2.0 parts of sodium salfate into 100 parts of water. Thereafter, the film was dipped for 5 minutes into 65° C. aqueous solution prepared by dissolving 7.5 parts of boric acid into 100 parts of water, and then washed with 20° C. water for 20 seconds to obtain a dye-containing polarizing film having neutral color. 20 The light polarization characteristics of the resulting film are shown in Table 1.

EXAMPLE 5

According to the same method as in Example 1, a substrate of polarizing film was prepared. The resulting film was dipped for 40 minutes into 65° C. aqueous solution prepared by dissolving 0.025 part of potassium salt of copper-containing disazo dye represented by the formula (I-11), 0.006 part of sodium salt of copper-containing trisazo dye represented by the formula (III-5), 0.025 part of C.I. direct yellow 2 and 2.0 parts of sodium salfate into 100 parts of water. Thereafter, the film was dipped for 5 minutes into 65° C. aqueous solution prepared by dissolving 7.5 parts of boric acid into 100 parts of water, and then washed with 20° C. water for 20 seconds to obtain a dye-containing polarizing film having neutral color.

The light polarization characteristics of the resulting film are shown in Table 1.

EXAMPLE 6

According to the same method as in Example 1, a substrate of polarizing film was prepared. The resulting film was dipped for 5 minutes into 69° C. aqueous solution prepared by dissolving 0.101 part of potassium salt of copper-containing disazo dye represented by the formula (I-11), 0.010 part of sodium salt of copper-containing trisazo dye represented by the formula (III-5), 0.006 part of C.I. direct orange 39 and 2.0 parts of sodium salfate into 100 parts of water. Thereafter, the film was dipped for 5 minutes into 65° C. aqueous solution prepared by dissolving 7.5 parts of boric acid into 100 parts of water, and then washed with 20° C. water for 20 seconds to obtain a dye-containing polarizing film having neutral color.

The light polarization characteristics of the resulting film are shown in Table 1.

EXAMPLE 7

According to the same method as in Example 1, a substrate of polarizing film was prepared. The resulting film was dipped for 30 minutes into 65° C. aqueous solution prepared by dissolving 0.105 part of potassium salt of copper-containing disazo dye represented by the formula (I-11), 0.012 part of C.I. direct red 81, 0.008 part of C.I. direct orange 39 and 2.0 parts of sodium salfate into 100 parts of water. Thereafter, the film was dipped for 5 minutes into 65° C. aqueous solution prepared by dissolving 7.5 parts of boric acid into 100 parts of water, and then washed with 20° C. water for 20 seconds to obtain a dye-containing polarizing film having neutral color.

The light polarization characteristics of the resulting film are shown in Table 1.

Comparative Example 1

According to the same method as in Example 1, a substrate of polarizing film was prepared. The resulting film was dipped for 2 minutes into 60° C. aqueous solution prepared by dissolving 0.302 part of sodium salt of copper-containing disazo dye represented by the formula (II-1), 0.177 part of C.I. direct red 81, 0.046 part of C.I. direct Yellow 12 and 2.0 parts of sodium salfate into 100 parts of water. Thereafter, the film was dipped for 5 minutes into 65° C. aqueous solution prepared by dissolving 7.5 parts of boric acid into 100 parts of water, and then washed with 20° C. water for 20 seconds to obtain a dye-containing polarizing film having neutral color.

The light polarization characteristics of the resulting film are shown in Table 1.

Comparative Example 2

According to the same method as in Example 1, a substrate of polarizing film was prepared. The resulting film was dipped for 1 minutes into 60° C. aqueous solution prepared by dissolving 0.015 part of C.I. direct violet 9, 0.005 part of C.I. direct blue 202 and 2 parts of sodium salfate into 100 parts of water. Thereafter the film was dipped for 5 minutes into 65° C. aqueous solution prepared by dissolving 7.5 parts of boric acid into 100 parts of water, and then washed with 20° C. water for 20 seconds to obtain a dye-containing polarizing film having neutral color.

The light polarization characteristics of the resulting film are shown in Table 1.

TABLE 1

|  | Y* | Py | ΔTr | Tr. max |
|---|---|---|---|---|
| Example 1 | 39.0% | 99.1% | 0.3% | 0.4% |
| Example 2 | 38.0 | 99.1 | 1.9 | 1.9 |
| Example 3 | 38.6 | 99.1 | 1.8 | 1.8 |
| Example 4 | 39.5 | 99.2 | 1.2 | 1.2 |
| Example 5 | 40.0 | 99.3 | 3.4 | 3.4 |
| Example 6 | 39.9 | 99.2 | 2.8 | 2.9 |
| Example 7 | 39.0 | 99.1 | 1.2 | 1.2 |
| Comparative Example 1 | 38.7 | 99.3 | 20.3 | 20.5 |

*Y of one piece of the polarizing film.

The dye-containing polarizing film of the present invention exhibits polarizing activities not smaller than that of a iodine containing polarizing film, has excellent durability and does not cause light to break through within the visible radiation wavelength region, particularly 400 to 700 nm, in a state wherein two polarizing films are superposed upon each other so that their orientation direction meet at right angles.

Hence, the polarizing film of the present invention is preferably applied to a variety of liquid crystal displays, particularly to displays for automobiles which require excellent polarizing activities, durability and high contrast and to displays for industrial instruments used in a variety of circumstances.

What we claim are:

1. A dye-containing polarizing film which causes no light to break through the cross state over the visible wave length region and which comprises, in a film substrate,
   1) one kind of disazo dye (I) and two kinds of dyes selected from the group [C],
   2) one kind of disazo dye (I), one kind of dye selected from the group [A] and two kids dyes selected from the group [C], or
   3) one kind of disazo dye (I), one kind of dye selected from the group [B] and one kind of dye selected from the group [C];

wherein a disazo dye which free-acid form is represented by the formula (I)

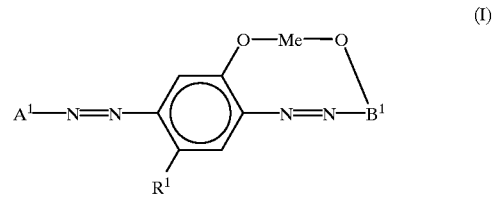

(I)

wherein Me is copper, $A^1$ is a phenyl group which is substituted by at least one member selected from the group consisting of sulfo, sulfamoyl, nitro, $C_1$–$C_4$ alkyl, $C_1$–$C_4$ alkoxy, carboxy, halogen, and unsubstituted amino or amino substituted by one or two substituents selected from $C_1$–$C_4$ alkyl, hydroxy or cyano-substituted $C_1$–$C_4$ alkyl and $C_1$–$C_4$ alkylcarbonyl; or a napthyl group which is substituted by at least one of sulfo or hydroxy, $B_1$ is a 1-naphthol or 2-naphthol residue which is substituted by sulfo or by sulfo and at least one member selected from the group consisting of hydroxy, unsubstituted amino and amino substituted by one or two substituents selected from $C_1$–$C_4$ alkyl, $C_1$–$C_4$ alkylcarbonyl, carbamoyl, sulfamoyl, unsubstituted phenyl, unsubstituted benzoyl, and phenyl or benzoyl substituted by sulfo, amino or $C_1$–$C_4$ alkoxy, and in which its hydroxy group is adjacent to the azo group and is linked with the transition metal Me to form the complex, and $R_1$ is a $C_1$–$C_4$ alkoxy;

a group [A] consisting of disazo dyes which free acid form is represented by the following formula (II)

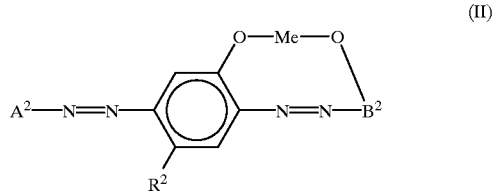

(II)

wherein Me is copper, $A^2$ is a phenyl group which is substituted by at least one member selected from the group consisting of sulfo, sulfamoyl, nitro, $C_1$–$C_4$ alkyl, $C_1$–$C_4$ alkoxy, carboxy, halogen, and unsubstituted amino or amino substituted by one or two substituents selected from $Cl_1$–$C_4$ alkyl, hydroxy or cyano-substituted $C_1$–$C_4$ alkyl and $C_1$–$C_4$ alkylcarbonyl; or a naphthyl group which is substituted by at least one of sulfo or hydroxy, $B^2$ is a 1-naphthol or 2-naphthol residue which is substituted by sulfo or by sulfo and at least one member selected from the group consisting of hydroxy, unsubstituted amino and amino substituted by one or two substituents selected from $C_1$–$C_4$ alkyl, $C_1$–$C_4$ alkylcarbonyl, carbamoyl, sulfamoyl, unsubstituted phenyl, unsubstituted benzoyl, and phenyl or benzoyl substituted by sulfo, amino or $C_1$–$C_4$ alkoxy, and in which the hydroxy group is adjacent to the azo group and is linked with the transition metal Me to form the complex, and $R^2$ is hydrogan, $C_1$–$C_4$ alkyl, sulfo or unsubstituted amino or amino substituted by $C_1$–$C_4$ alkyl, $C_1$–$C_4$ alkylcarbonyl, $C_1$–$C_4$ alkylsulfonyl or carbamoyl;

a group [B] consisting of trisazo dyes which free acid form is represented by the following formula (III)

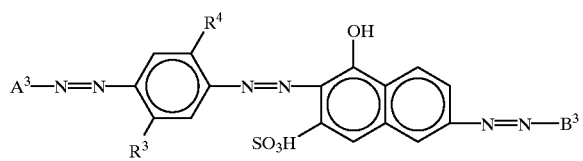

(III)

wherein $A^3$ and $B^3$ are same or different and are phenyl group which is substituted by at least one member selected from the group consisting of sulfo, sulfamoyl, nitro, $C_1$–$C_4$ alkyl, $C_1$–$C_4$ alkoxy, carboxy, halogen, unsubstituted amino and amino substituted by $C_1$–$C_4$ alkyl, hydroxy or cyano-substituted $C_1$–$C_4$ alkyl, $C_1$–$C_4$ alkylcarbonyl, phenyl, sulfophenyl, disulfophenyl, benzyl or carbamoyl; or naphthyl group which is substituted by at least one member selected from sulfo, hydroxy, unsubstituted amino and amino substitued by $C_1$–$C_4$ alkyl, hydroxy or cyano-substituted $C_1$–$C_4$ alkyl, $Cl_1$–$C_4$ alkylcarbonyl, phenyl, sulfophenyl, disulfophenyl, benzyl or carbamoyl, $R^3$ is hydrogen, $C_1$–$C_4$ alkyl, $C_1$–$C_4$ alkoxy, sulfo or unsubstituted amino or amino substituted by $C_1$–$C_4$ alkyl, $C_1$–$C_4$ alkylcarbonyl, $C_1$–$C_4$ alkylsulfonyl or carbamoyl, $R^4$ is hydrogen, hydroxy or $C_1$–$C_4$ alkoxy, copper complex salts thereof; and a group [C] consisting of C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81 and C.I. Direct Red 247;

the weight ratio of the disazo dye (I) to the at least two kinds of dyes selected from the group consisting of [A], [B] and [C] being in the range of 0.1 to 3.0.

2. The dye-containing polarizing film according to claim 1, wherein the disazo dye represented by formula (I) is a copper complex salt.

3. The dye-containing polarizing film according to claim 1, which comprises at least one kind of disazo dyes represented by formula (II) and said disazo dye is a copper complex salt.

4. The dye-containing polarizing film according to claim 1 wherein the substrate of the film is a film made of polyvinyl alcohol or derivative thereof.

5. The dye-containing polarizing film according to claim 2, which comprises at least one kind of disazo dyes represented by formula (II) and the disazo dye is a copper complex salt.

6. The dye-containing polarizing film according to claim 2 which comprises one kind of disazo dyes represented by formula (I) and two kinds of dyes selected from the group.

7. The dye-containing polarizing film according to claim 6 which further comprises one kind of dye selected from the group [A].

8. The dye-containing polarizing film according to claim 2 which comprises one kind of disazo dye represented by formula (I), one kind of dye selected from the group [B] and one kind of dye selected from the group [C].

* * * * *